United States Patent
Buening et al.

(10) Patent No.: US 6,703,758 B2
(45) Date of Patent: Mar. 9, 2004

(54) ROTOR FOR AN AC GENERATOR

(75) Inventors: Duane Joseph Buening, Anderson, IN (US); Michael L. Hull, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 49 days.

(21) Appl. No.: 09/900,248

(22) Filed: Jul. 6, 2001

(65) Prior Publication Data

US 2003/0006667 A1 Jan. 9, 2003

(51) Int. Cl.$^7$ ................................................ H02K 1/22
(52) U.S. Cl. ........................................ 310/263; 310/51
(58) Field of Search ......................... 310/263, 51, 257, 310/261

(56) References Cited

U.S. PATENT DOCUMENTS

| | | | | |
|---|---|---|---|---|
| 3,714,484 A | * | 1/1973 | Habert ........................ 310/263 |
| 4,201,930 A | * | 5/1980 | Inagaki et al. .............. 310/263 |
| 4,263,526 A | * | 4/1981 | Taguchi et al. ............. 310/263 |
| 4,588,911 A | | 5/1986 | Gold ............................ 310/62 |
| 5,122,705 A | * | 6/1992 | Kusase et al. ............. 310/68 D |
| 5,270,605 A | * | 12/1993 | Lefrancois et al. .......... 310/263 |
| 5,382,862 A | | 1/1995 | Ward et al. .................. 310/263 |
| 5,708,318 A | * | 1/1998 | Fudono ........................ 310/263 |
| 6,114,793 A | * | 9/2000 | Asao et al. .................. 310/263 |
| 6,404,096 B1 | * | 6/2002 | Kometani et al. ........... 310/261 |
| 6,433,455 B1 | * | 8/2002 | Kometani et al. ........... 310/263 |

FOREIGN PATENT DOCUMENTS

| | | |
|---|---|---|
| EP | 0454039 | 10/1991 |
| EP | 1122858 | 8/2001 |
| EP | 1148618 | 10/2001 |
| FR | 2432795 | 2/1980 |
| GB | 1156788 | 7/1969 |

\* cited by examiner

*Primary Examiner*—Dang Le
(74) *Attorney, Agent, or Firm*—Jimmy L. Funke

(57) ABSTRACT

An improved shape for a tooth of a rotor assembly in an AC generator is generally trapezoidal in shape and includes a base, a tip, and leading and trailing edges. The leading edge comprises a first portion, and a second portion. The first portion extends from the tip toward the base, and the second portion extends from the first portion toward the base. The second portion slopes at a first rate that would cover about one slot pitch were it allowed to continue all the way up to the tip. However, the first slope continues only to a transition point. The first portion is generally parallel to the trailing edge of an adjacent, magnetically opposing rotor tooth. The modified tooth presents a wider tooth cross-section.

9 Claims, 3 Drawing Sheets

ROTOR FOR AN AC GENERATOR

BACKGROUND OF THE INVENTION

1. Technical Field

The present invention is directed toward rotating electric machines having a rotor.

2. Description of the Related Art

This invention relates to an alternating current generator of the Lundell type that has a pair of rotor segments provided with interleaved pole teeth or fingers and a rotor core that carries a field coil. In a common, conventional, thirty-six stator tooth, twelve rotor pole 3-phase configuration, a rotor tooth 10 is fashioned so that it is in a generally trapezoidal shape, having a base 12, a tip side 14 opposite the base 12, and leading and trailing edges 16 and 18, as shown in FIG. 1. The direction of movement of rotor teeth 12 relative to stator teeth 20 is shown by arrow 22. In such a configuration, the base 12 has a length of about three stator slot pitches, with each of the leading and trailing edges sloping about one slot pitch. However, an AC generator of the type having teeth 10 exhibits a magnetic sound that is produced during operation, which may be found objectionable depending on the circumstances.

One approach taken in the art to reduce magnetic noise involves skewing the leading edge in the direction of movement, as also shown in FIG. 1, with the rotor tooth now having leading and trailing edges 24 and 26. The centerline of the tooth, rather than bisecting both the base and tip each into roughly equal halves, is moved toward the leading edge of the rotor tooth.

Another approach taken in the art to reduce magnetic noise is seen by reference to U.S. Pat. No. 4,201,930 to Inagaki et al. Inagaki et al. disclose a claw tooth rotor having irregular trapezoidal shaped teeth wherein the tip is displaced in the direction of the rotation of the rotor.

There is a need, however, for continuous reductions in the level of magnetic noise produced by AC generators, particularly those used in an automotive vehicle, while maintaining or improving electrical efficiency of the generator.

There is therefore a need for an improved alternator and/or portions thereof that minimize or eliminate one or more of the problems as set forth above.

SUMMARY OF THE INVENTION

An object of the present invention is to provide a solution to one or more of the problems set forth in the Background.

One advantage of the present invention is that an improved rotor pole shape suitable for incorporation into an AC generator is operative to reduce magnetic noise and improve performance during operation. Another advantage, in a preferred embodiment, is that of providing reduced magnetic noise, while only requiring the use of six diodes in a rectifying portion of an AC generator having a 12-pole rotor, 72-slot stator using a distributed 3-phase winding, rather than 12 diodes for a like generator having two sets of windings.

According to the invention, an alternating current (AC) generator is provided that includes an armature core having a plurality of teeth separated by intervening slots spaced according to a slot pitch. The generator includes at least one multiphase winding disposed on the armature core, and a rotor disposed in the armature having a plurality of pairs of rotor poles, each pair respectively configured for energization in opposite magnetic polarity, the poles comprising a trapezoidal shape having a base, a leading side, a trailing side, and a tip side, wherein the leading side has a plurality of portions. In a preferred embodiment, optionally, the leading side has a first portion extending from the tip (toward the base) sloping at a first rate and a second portion extending away from the first portion (also toward the base) sloping at a second rate less than the first rate. More preferably, the first portion slopes between about one and two slot pitches and the second portion slopes between about one-half and one and one-half slot pitches.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 2:
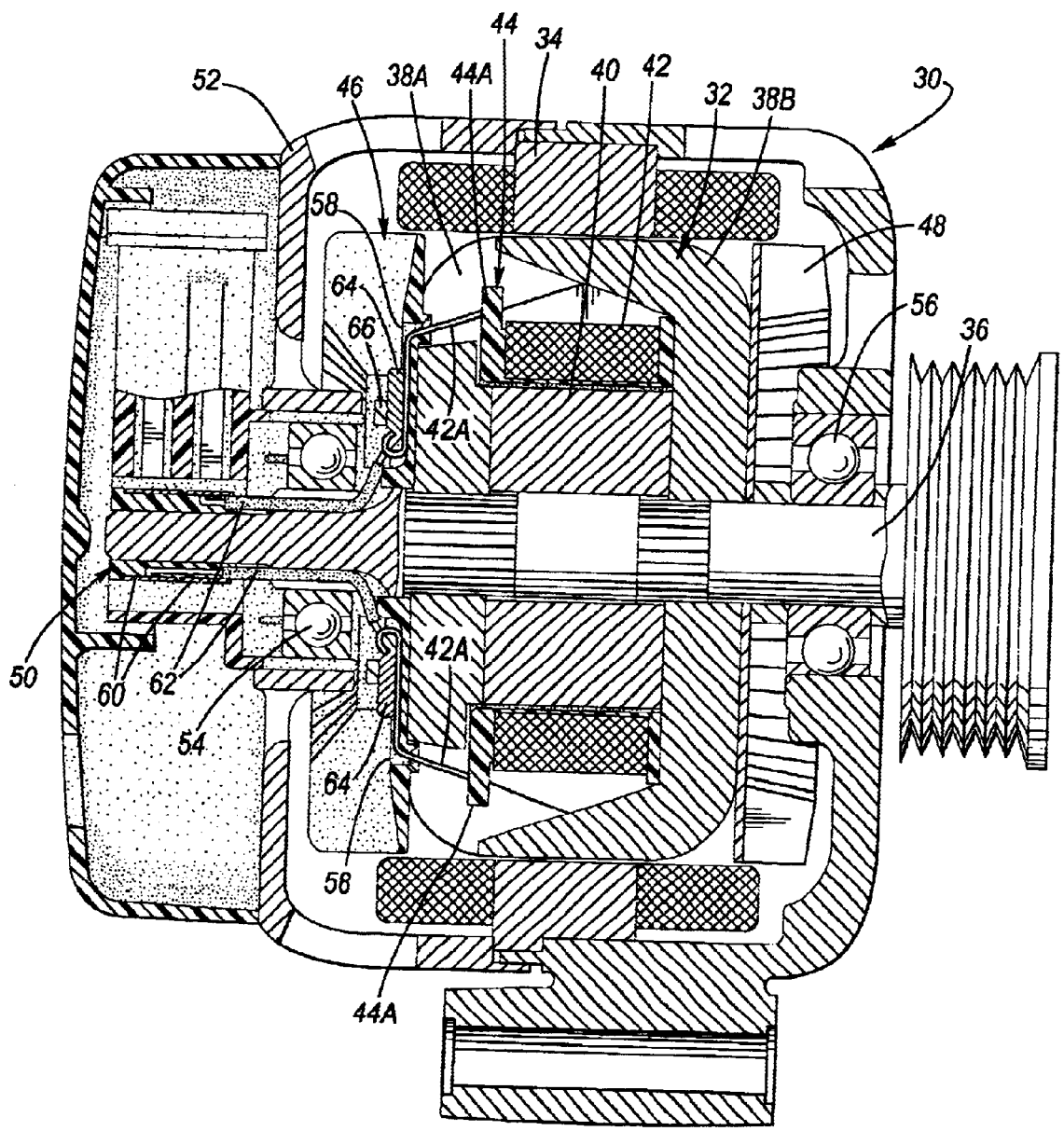
FIG. 2 is a sectional view of an AC generator in which the inventive rotor configuration may be used.

Referring now to the drawings wherein like reference numerals identify like components in the various views, FIG. 2 is a simplified cross-sectional view of an AC generator 30 in which a rotor segment having an improved rotor tooth shape may be suitably used. The following description of generator 30 is exemplary only and not limiting in nature. Other configurations may be employed and remain within the spirit and scope of the present invention. Generator 30 is sometimes referred to herein as an alternator.

Alternator 30 has a rotor assembly generally designated by the reference numeral 32 and stator assembly generally designated by the reference numeral 34. The rotor assembly 32 includes a shaft 36 supporting all rotating magnetic circuit structures thereof including pole-members 38A and 38B, rotor core 40 and field coil 42 wound upon bobbin 44. Each pole member includes a plurality of generally trapezoidal shaped (when viewed toward their face) rotor poles. Additionally, all other non-magnetic circuit rotating structures are carried thereby, including air circulation fans 46 and 48 located at axially opposite sides of the pole-members, and a slip ring assembly 50 located at one extreme end of the shaft. Fan 48 may be formed from sheet metal stock and spot welded to pole-member 38B while fan 46 may be formed from an appropriate thermoplastic material and secured to tower extensions (not shown) from the field coil bobbin 44. The shaft 36 in turn is rotatably supported within a housing 52 by a pair of bearings 54 and 56. Bearing 54 is located between the slip ring assembly 50 and the fan 46.

Coil leads 42A of field coil 42 are wrapped about respective posts 44A of bobbin 44 and pass through holes 58 in fan 46. Slip ring assembly 50 is made of a pair of copper rings 60, each having a slip ring lead 62 joined such as by welding thereto. The copper rings and wires are molded into a thermoset material to complete the slip ring assembly. Slip ring assembly 50 is pressed onto the end of rotor shaft 36 and the slip ring leads 62 are routed into channels along the shaft 36 where they are joined, such as by twisting and welding, to the coil leads 42A of field coil 42 via a joint 64. The joint 64 is then bent to the surface of the fan 46 and received in a pyramid-shaped tab structure 66. The joint 64 is then secured to fan 46 by ultrasonic welding of the plastic material of the tab 66. Bearing 54 is assembled to pass over the slip ring assembly 50 to retain the lead wires 62 securely within the shaft channels.

The stator assembly 34 further includes in one embodiment, at least one multiphase winding, for example, one 3-phase winding distributed through and among the stator slots, as known. In such a configuration, a rectifying circuit (not shown), conventionally includes six (6) diodes in a bridge configuration for rectifying the 3-phase AC output into a DC output preferred in automotive vehicles. In another embodiment, the stator assembly 34 may include two sets of three-phase windings, one offset from the other, also in a known manner. In this second embodiment, however, generally twelve (12) diodes are required to rectify the AC output from the two sets of 3-phase windings. Of course, other winding arrangements and stator slot counts are possible, and still remain within the spirit and scope of the present invention.

Figure 3:
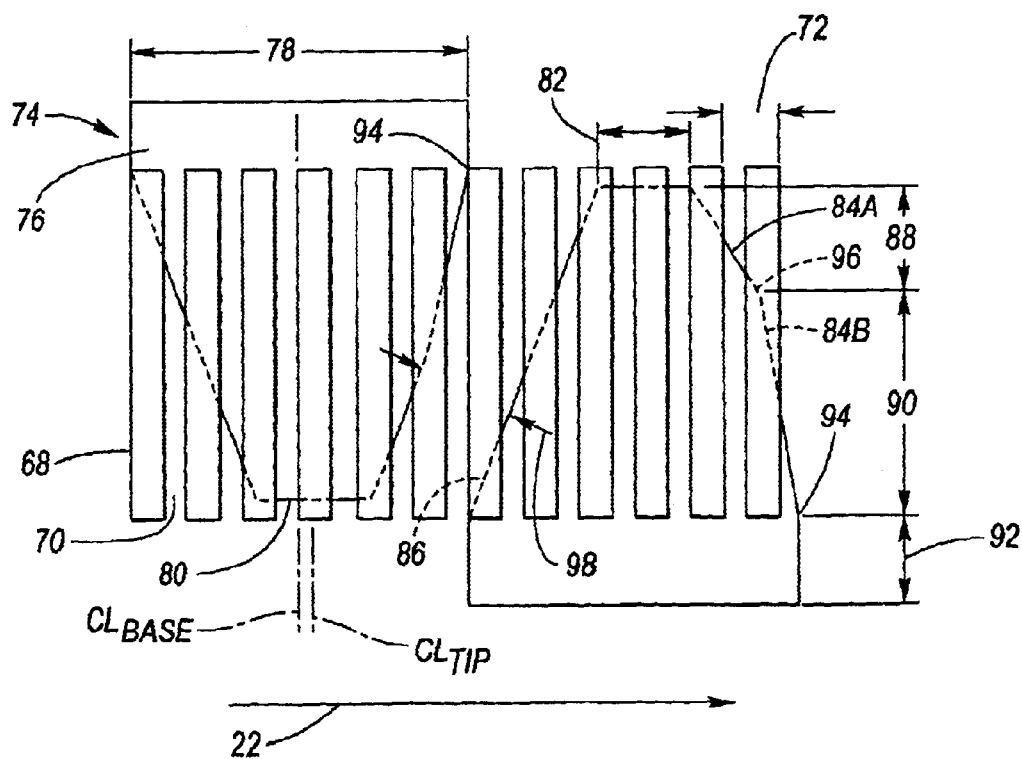
FIG. 3 is a plan view of rotor pole teeth according to the invention.

FIG. 3 is a simplified plan view of a pair of rotor poles or teeth according to the invention relative to stator assembly 34. Stator assembly 34 is shown in greater detail relative to FIG. 2, and includes a core (sometimes referred to herein as an armature core) having a plurality of individual stator teeth 68 separated by intervening slots 70. A stator tooth and slot together define a slot pitch 72, as shown. In a preferred embodiment, AC generator 30 includes a 72-slot stator assembly 34, and wherein the rotor assembly 32 includes 12 poles (i.e., 6 pole pairs —6 N poles and 6 S poles on segments 38A, 38B). Preferably, the 72-slot stator is configured with a distributed 3-phase stator winding, although two sets of 3-phase windings offset one from the other could also be used.

As further shown in FIG. 3, each pole member/segment 38A, 38B includes a plurality of poles defined by respective teeth 74. Each tooth 74 includes a base 76, a tip side 80 having a tip width 82, a leading edge side comprising a first portion 84A and a second portion 84B, and a trailing edge side 86. First portion 84A extends generally over a first distance 88, while the second portion 84B extends over a second distance 90. Thickness 92 describes the thickness of the rotor member/segments 38A, 38B. One feature of tooth 74 is that the tooth is offset generally in the direction of rotation of rotor assembly 32, the direction being designated by arrow 22. As shown in FIG. 3, a center line of tip 80, designated CLTIP, is offset from the center line of the base 76, designated CLBASE, in the direction 22 of rotation. According to the invention, the increase in the stator slot number from 36 (i.e., the number of slots in a conventional, standard 12-pole rotor, 3-phase generator where the slots per pole per phase, SPP=1, or 1 slot per pole per phase) to 72 allows modification of the rotor pole shape to reduce magnetic noise and improve performance. Significantly, the higher stator tooth count changes the slot pitch relationship and affects the stator cross face leakage. The inventive rotor pole shape according to the invention takes advantage of the higher slot count stator to reduce the magnetic noise level and improve performance. Tooth 74 generally has a leading edge 84 modified to closely match or exceed the slot pitch (i.e., one slot pitch) of the stator. The rotor tooth tip 80, generally, is widened further from the standard, conventional design without incurring losses due to cross face leakages. Broadly speaking, the tooth leading edge 84 is divided into a plurality of portions but is trimmed near the tip so that the distance between the adjacent, magnetically opposing pole is not reduced to the point of excessive losses.

Figure 1:
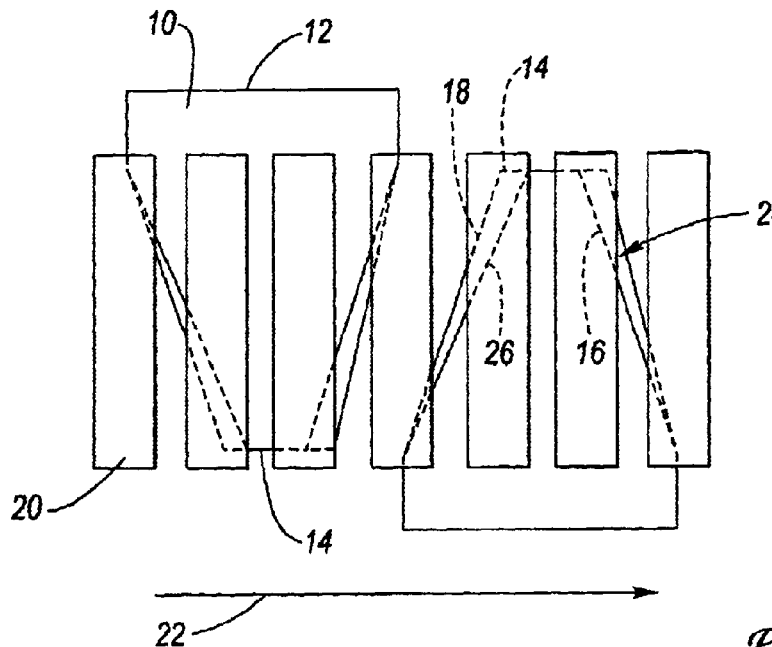
FIG. 1 is a plan view of a conventional claw type rotor pole with respect to stator teeth.

Portion 84B of the leading edge begins at base starting point 94 and extends to a transition point 96 sloping at a rate that would otherwise cover about one slot pitch were it allowed to continue all the way up to tip 80. However, portion 84B extends up only to transition point 96 until a gap width, designated by reference numeral 98, between the adjacent but magnetically opposing rotor pole becomes as close to each other as the narrowest distance between standard teeth in a skewed rotor arrangement of a 36 slot machine (e.g., as shown in FIG. 1). Portion 84A of the leading edge then slopes at a second rate that is parallel to the trailing edge 86 of the adjacent tooth. The portion 84A slopes at a rate that is greater than the slope rate of portion 84B. The trailing edge 86 of tooth 74 remains unchanged with respect to trailing edge 26 as shown in FIG. 1. In a preferred embodiment, first portion 84A slopes between about one and two slot pitches, and more preferably slopes about one slot pitch. Second portion 84B slopes between about one-half to one and one-half slot pitches, and more preferably slopes about three-quarters of one slot pitch (recall that portion 84B would slope about one slot pitch were it allowed to continue all the way up to tip 80; however, this progression is cut short when the upper portion nearest the tip—first portion 84A—is trimmed off of tooth 74).

A rotor tooth 74 according to the invention presents a wider tooth cross-section, which lowers the flux density in the air gap and provides an optimal leading edge for a 72-slot machine. It should be understood that the foregoing principles can be applied to other machines, for example, a 96-slot machine, such as an AC generator. It should be further understood that the plurality of portions of the leading edge may be increased in number to become an arc or a plurality of arcs.

Figure 4A:
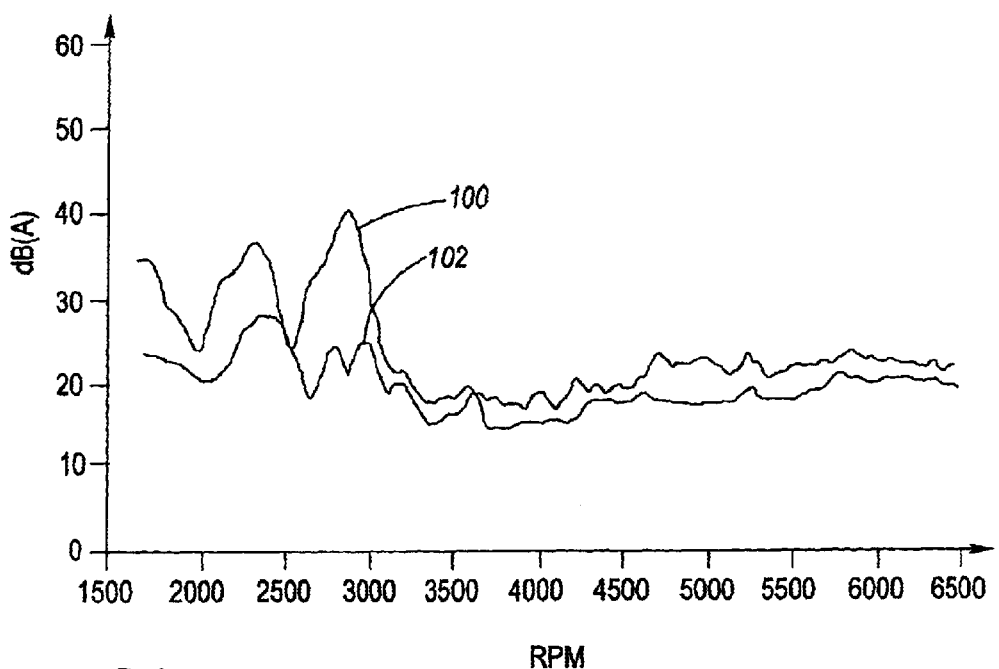
FIGS. 4A and 4B are a chart showing magnetic noise reductions according to the invention.
Figure 4B:
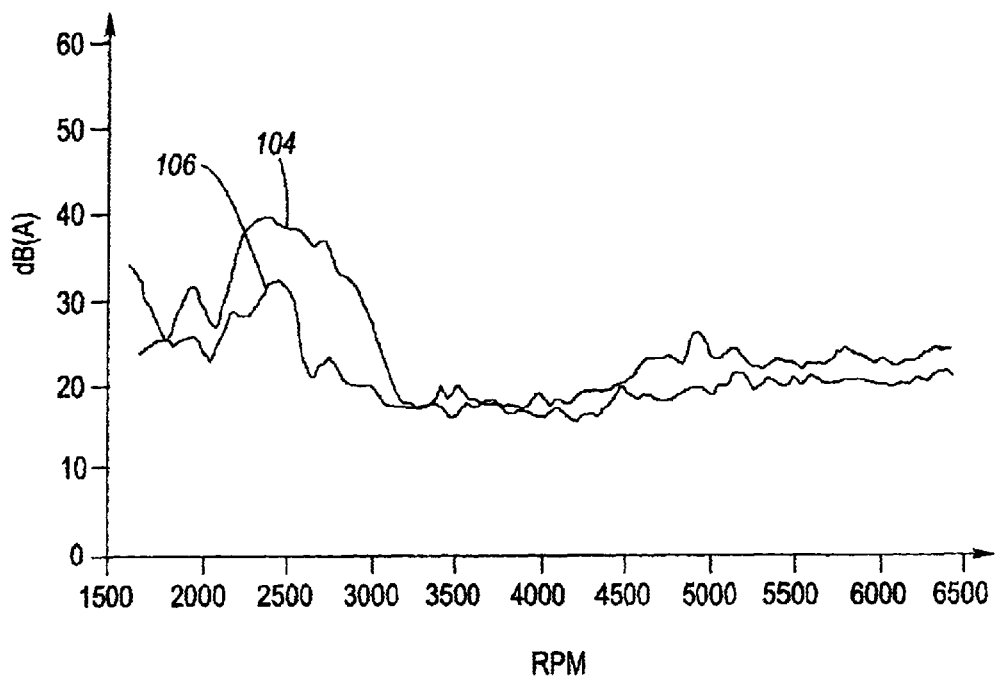

FIG. 4 shows improvements occasioned by the present invention. In particular, waveform 100 represents a noise level (dbA) of a conventional 36-slot, 12-pole 3-phase AC generator, while waveform 102 represents the magnetic noise level of an AC generator having the improved rotor according to the present invention (both waveforms 100, 102 being taken with respect to a microphone proximate the driver's side). Likewise, waveform 104 represents a passenger side noise level for a conventional 36-slot, 12-pole, 3-phase AC generator, while waveform 106 shows a reduced noise level of an AC generator 30 according to the invention having an improved rotor tooth shape. The levels shown in FIG. 4 are for the $36^{th}$ order noise level.

According to the invention, the decibel level increase in magnetic noise with generator electrical loading is about half that of a conventional generator, and can use conventional winding techniques. Significantly, the present invention in a preferred embodiment yields reduced magnetic noise in an AC generator using a single distributed 3-phase stator winding, which requires only six diodes for a rectifying bridge. Other approaches taken in the art for reducing noise require a pair of 3-phase windings offset one relative to the other, and which, significantly, require 12 diodes in the rectifying portion thereof (6 diodes for each set of windings). In many automotive applications, the above-mentioned 50% reduction is significant enough so as to render noise from the AC generator inaudible to, for example, the vehicle occupants.

What is claimed is:

1. An alternating current (AC) generator including an armature core having a plurality of teeth separated by intervening slots with a slot pitch, at least one multiphase winding disposed on said armature core, and a rotor disposed in said armature having a plurality of pairs of rotor poles and configured to rotate with a shaft, said shaft having an axis associated therewith, each pair respectively configured for energization in opposite magnetic polarity, said poles comprising a trapezoidal shape having a base, a leading side, a trailing side, and a tip side, said leading side having a plurality of portions in an axial direction, said trailing side is straight line between the tip side and the base, wherein said leading side has a first portion extending from said tip side sloping at a first rate, side leading side having a second portion extending from said first portion slopping at a second rate less than said first rate.

2. The AC generator of claim 1 wherein said first portion slopes between one and two slot pitches and said second portion slopes between one-half and one and one-half slot pitches.

3. The AC generator of claim 2 wherein said first portion slopes one slot pitch, said second portion slopes about three-quarters slot pitch.

4. The AC generator of claim 1 wherein said tip side is offset relative to said base, wherein said leading side has a first portion extending from said tip sloping at a first rate, said leading side having a second portion extending from said first portion sloping at a second rate less than said first rate.

5. The AC generator of claim 4 wherein said first portion slopes between one and two slot pitches and said second portion slopes between about one-half and one and one-half slot pitches.

6. The AC generator of claim 5 wherein said first portion slopes one slot pitch, said second portion slopes about three-quarters slot pitch.

7. The AC generator of claim 4 wherein said offset is in a direction of rotation of said rotor.

8. An alternating current (AC) generator including an armature core having a plurality of teeth separated by intervening slots with a slot pitch, at least one multiphase winding disposed on said armature core, and a rotor disposed in said armature having a plurality of pairs of rotor poles and configured to rotate with a shaft, said shaft having an axis associated therewith, each pair respectively configured for energization in opposite magnetic polarity, said poles comprising a trapezoidal shape having a base, a leading side, a trailing side, and a tip side, said leading side having a plurality of portions in an axial direction, wherein said tip side is offset relative to said base, wherein said leading side has a first portion extending from said tip sloping at a first rate, said leading side having a second portion extending from said first portion sloping at a second rate less than said first rate, said first portion slopes between one and two slot pitches and said second portion slopes between about one-half and one and one-half slot pitches, wherein said trapezoidal shape further includes a pair of shank portions extending from said base, said trailing side is a straight line in the axial direction between said tip side and one of said shank portions extending from said base.

9. The generator of claim 8 wherein said generator includes seventy-two teeth and six pairs of poles, said multiphase winding is a three-phase winding and wherein said trailing side is disposed at an incline relative to the axial extent of said teeth of said armature, said trailing side extending in parallel with said leading side of an adjacent pole for a predetermined length.

\* \* \* \* \*